Jan. 12, 1943. J. A. POTCHEN ET AL 2,308,453
APPARATUS FOR MANUFACTURING LAMINATED MATERIAL
Filed May 20, 1939 3 Sheets-Sheet 1
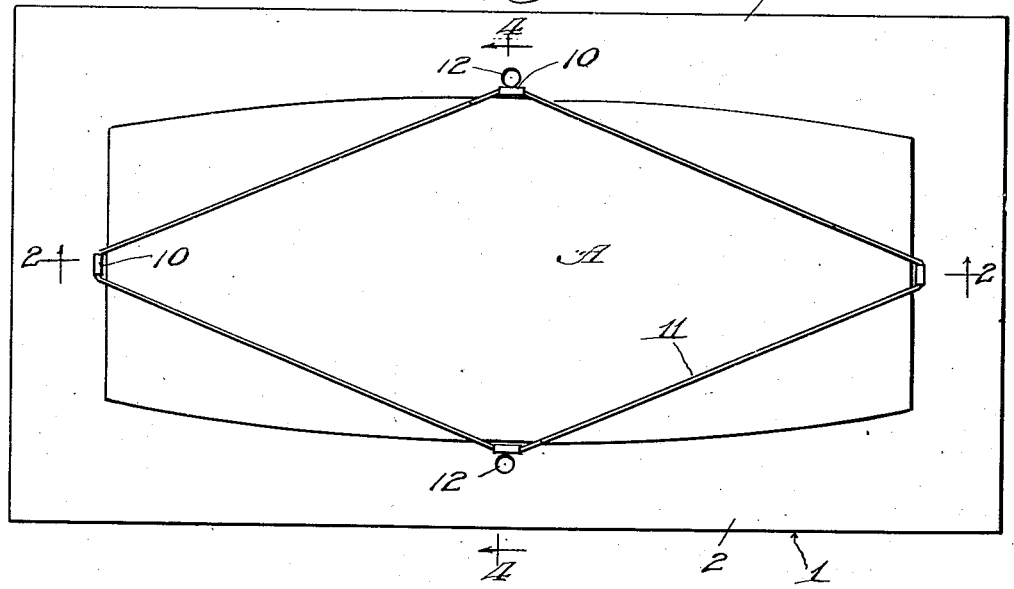
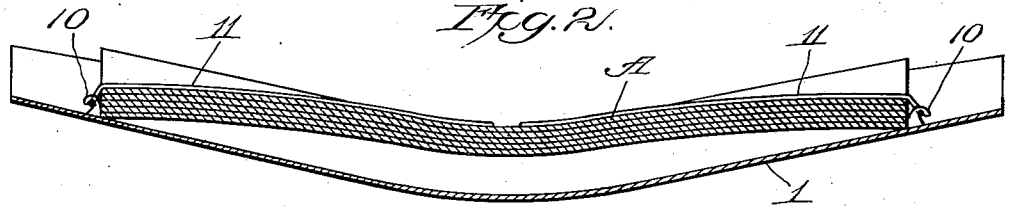
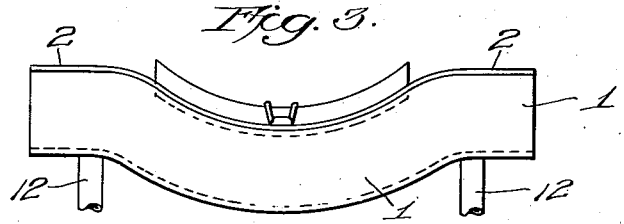
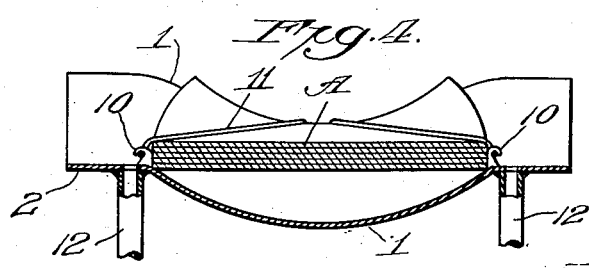

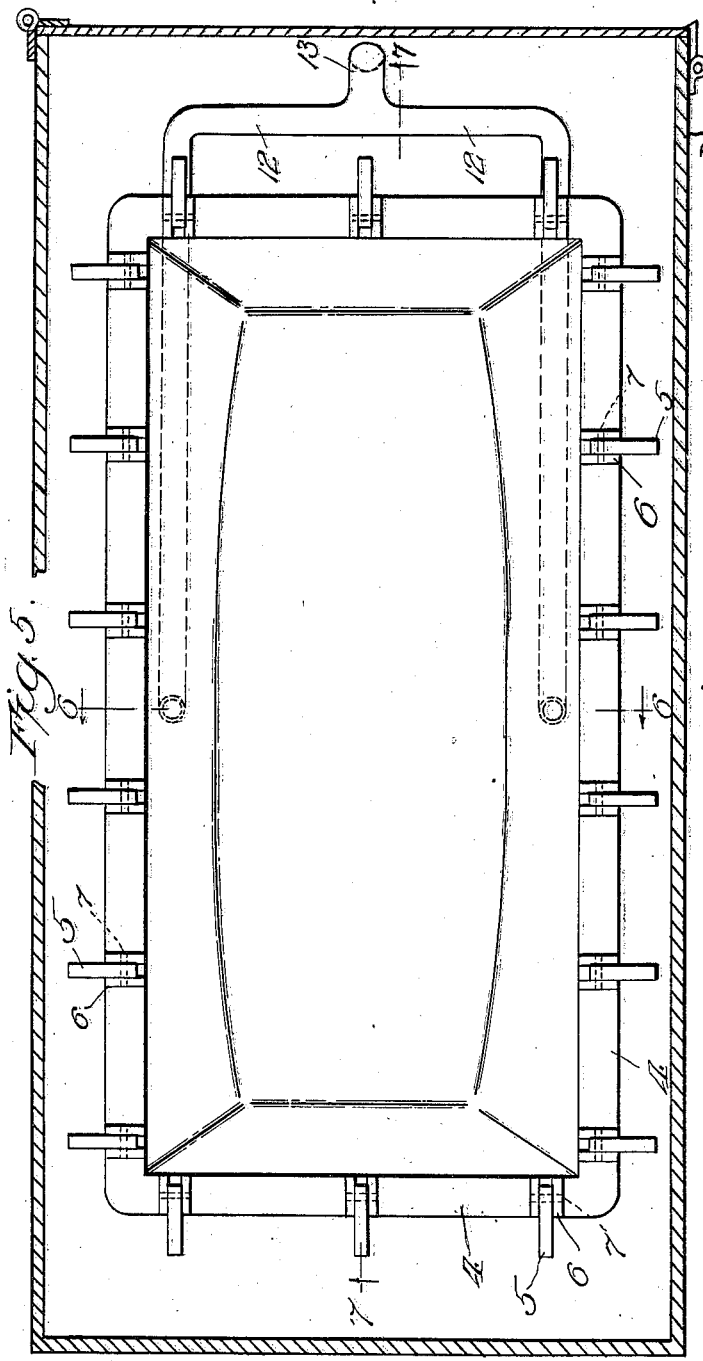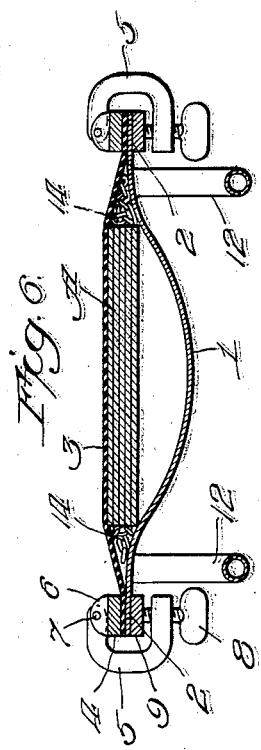

Jan. 12, 1943. J. A. POTCHEN ET AL 2,308,453
APPARATUS FOR MANUFACTURING LAMINATED MATERIAL
Filed May 20, 1939 3 Sheets-Sheet 3
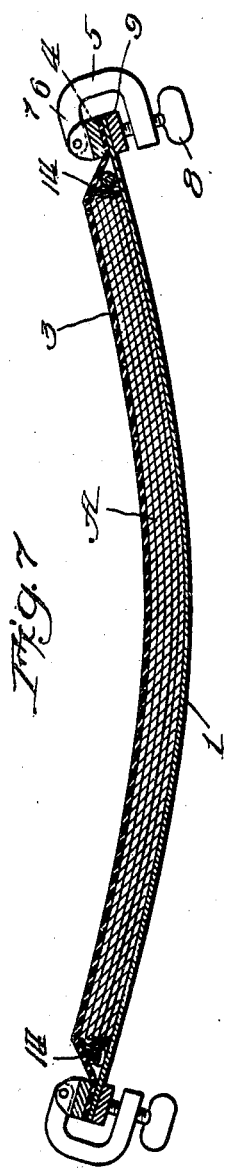
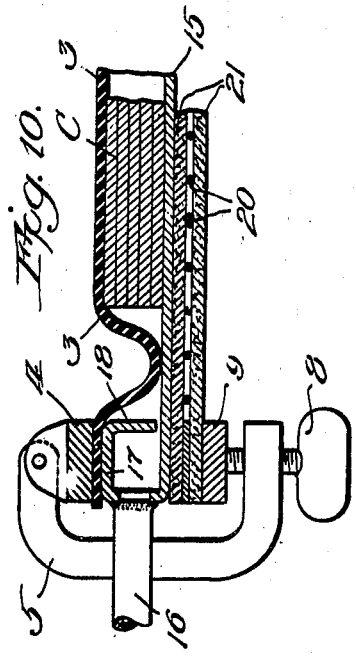
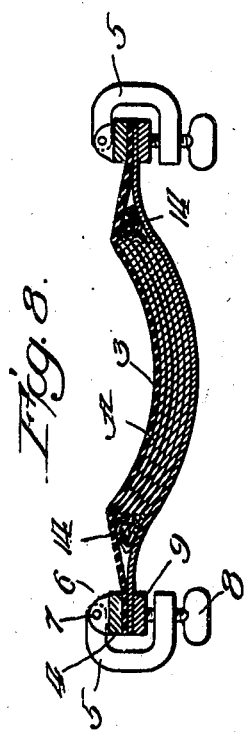
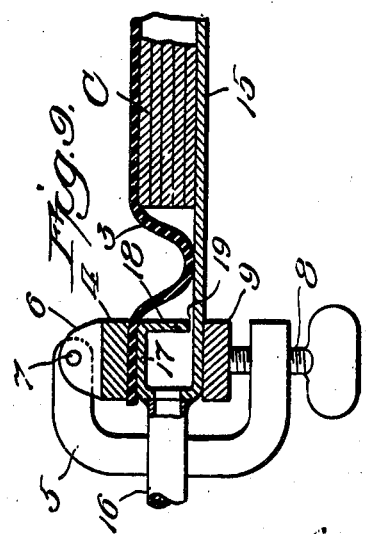

UNITED STATES PATENT OFFICE 2,308,453

APPARATUS FOR MANUFACTURING LAMINATED MATERIAL

Joseph A. Potchen, Grand Rapids, Mich., and Olin H. Basquin, Evanston, Ill., assignors to John F. Neary, Jr., Englewood, N. J., as trustee Application May 20, 1939, Serial No. 274,706

4 Claims. (Cl. 144—281)

The present invention relates to apparatus for manufacturing laminated materials, and has particular reference to apparatus for making accurately-shaped multiply panels, whether flat or curved in one or more directions, preferably with the use of bonding materials that require heat and pressure for bonding the plies together while they are molded into conformance with the contour of a die or form, and one object of the invention is the provision of apparatus capable of producing such molded panels in quantity, without the use of presses or heavy and rigid forms or dies.

In accordance with the invention, a light-weight die or form of substantially uniform thickness and accurately shaped to the contour desired for the face of the panel to be molded, is covered by a flexible blanket or cover that is capable of being sealed around the die or form to constitute a sealed chamber. The various layers or plies, with heat-responsive bonding material interposed between them, constituting the rudimentary panel assembly, are laid, one upon the other, upon the form or die and the blanket placed over the assembly and sealed about the form or die, as described. The package thus produced is placed in a sealed chamber which is then filled with steam at the desired pressure. The steam supplies both the heat energy required to produce the necessary transformation in the bonding material and the mechanical force to press the plies together and make the bond or bonds effective. Inasmuch as the steam pressure is applied equally to all exterior surfaces of the package, the panel and the die are pressed together by equal and oppositely directed forces. Therefore, the die need be only slightly more rigid than the panel in order to cause the panel to conform to the die. Thus the die does not have to be a strong rigid element capable of withstanding the pressures involved in the molding operation. The heat of the steam acts to raise the temperature of any air trapped within the package or receptacle containing the rudimentary panel, causing it to expand, and, if there is any substantial amount of moisture present in the contents of the receptacle, this moisture will be transformed into steam having a temperature approaching that of the outside steam and having, therefore, a pressure approximating that of the steam which is doing the work. In order to prevent the development of any substantial or, at least, objectionable back pressure of such steam and trapped air in the receptacle formed by the die and the blanket in which bonding of laminated products is being accomplished, each receptacle is provided with a properly disposed vent or vents leading to the exterior of the steam chamber within which the receptacle is located.

The die or form used in practicing the present invention may be simply a member having a flat face against which the panel is firmly pressed during the bonding operation, or it may have a face curved in a single direction to produce a bent product, or in directions transverse to each other, to produce a molded product. Dies for bent or molded work may be made from sheet metal and thus be light and inexpensive, while sufficiently sturdy to give to the panels bonded in conjunction therewith any desired shapes. Therefore, viewed in one of its aspects, the present invention may be said to have for an object a simple and novel form or die on which the bonding of flat, curved or molded multi-ply panels may be produced.

It will be evident that the die or form may be employed as a part of the receptacle or container for the work, a receptacle being composed of a form of die and an overlying flexible blanket of heat-resisting rubber, for example, suitably fastened to the die as a cover overlying the rudimentary panel. Thus, viewing the present invention in a further aspect, it may be said to have for an object a novel form of collapsible receptacle for containing work to be bonded and shaped through the application of pressure of a fluid surrounding the receptacle.

While the heat and pressure required for a bonding or bonding and forming operation may be supplied through the medium of steam, other fluids as, for example, compressed air, may serve to supply the pressure, while the heat energy may be obtained through some other agency. Thus, for example, the under or outer side of the die may have an electrically energized heating element attached thereto, so that the necessary heat units will be delivered to the work through the form or die itself. Therefore, viewed in another of its aspects, the present invention may be said to have for an object the provision of separate heating means in conjunction with means for supplying either a hot, warm or cool fluid under pressure within a sealed chamber containing the collapsible receptacle which enclosed the work.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a top plan view of a die forming part of a receptacle or container in which a multi-ply panel is to be bonded and shaped, the panel assembly being shown tied down against the die member; Fig. 2 is a section on line 2—2 of Fig. 1; Fig. 3 is an end view of the structure shown in Figs. 1 and 2; Fig. 4 is a section on line 4—4 of Fig. 1; Fig. 5 is a view similar to Fig. 1, the receptacle being completed by means of a flexible blanket or cover overlying the panel assembly and clamped to the die, and portions of two walls of a pressure chamber within which the receptacle or container is placed; Fig. 6 is a section on line 6—6 of Fig. 5, limited to that which appears in the plane of the section, showing the condition of the parts before the application of external pressure; Fig. 7 is a section on line 7—7 of Fig. 5, limited to that which lies in the plane of the section and illustrating the conditions existing after the pressure chamber has been filled with fluid under pressure; Fig. 8 is a view similar to Fig. 7 but taken on line 6—6 of Fig. 5; Fig. 9 is a section through a modified form of receptacle or container housing a panel assembly; and Fig. 10 is a view similar to Fig. 9, illustrating a means for heating the form or die irrespective of any heating action on the part of the surrounding fluid medium.

In the drawings the invention is illustrated as applied to the manufacture of a long, narrow molded plywood panel, adapted for use as a barrel stave and, for the sake of brevity, the detailed description will be confined to this particular embodiment. Referring to the first eight figures of the drawings, 1 represents a sheet metal form or die the body portion of which is curved longitudinally and transversely to produce a shallow dish which is long and narrow, and has the contour desired for the outer face of the finished panel. Along the side margins of the body member are flanges 2 projecting laterally and outwardly. Cooperating with this form or die is a flexible cover or blanket 3, preferably of rubber of such a character that it will not be injured through contact with the steam, at pressures of from fifty to one hundred and twenty-five pounds per square inch, or more, employed in our process. The marginal portions of the blanket or cover are adapted to overlie the flanges 2 and the end marginal portions of the die, and to be clamped thereto so as to form with the die a sealed receptacle or container. The clamping means consists conveniently of a rectangular frame 4 of flat, bar material that rests on top of those portions of the blanket or cover which overlie the flanges 2 and the marginal portions of the die at the ends of the die. Associated with the frame 4 are C-shaped clamping dogs 5 one arm of each of which is hinged between a pair of upwardly-projecting ears 6 by means of a hinge pin 7; the dogs being large enough to permit the free arm of each to be swung down underneath the adjacent marginal portion of the die. Passing through the free arm of each clamping dog is a thumb screw 8 which may be turned to bear against the under surface of the die and thus force the frame 4 and the underlying portions of the die together and clamping the marginal portions of the blanket firmly between the same. In order to strengthen the marginal portions of the die so as to minimize the danger of leakage through the joint between the cover and the die, we reenforce them by welding to the under side of the die an element or elements 9 constituting a frame similar to and registering with the frame 4 or something analogous to such a frame composed of short pieces each underlying one of the pairs of ears 6.

The work to be operated upon comprises an assembly A of veneers adapted to form a barrel stave when bonded together and suitably shaped or molded. Suitable heat-responsive bonding material as, for example, artificial resin of the thermosetting type, is interposed between the various layers of plies of the assembly, at some stage in the creation of the assembly, so that when the assembly is subjected to heat and pressure, all of the layers or plies will be bonded together.

While the blanket or cover may be applied over the panel assembly resting loosely on the die, it is sometimes advisable that the panel assembly be temporarily secured to the die to hold the plies in their proper relative positions and the panel assembly in the proper position on the die until the blanket or cover can be fastened over the same. In the arrangement shown, as best seen in Figs. 1 to 4, there are hooks 10 projecting upwardly from the die at the middle of the ends and of the long sides of the panel assembly. A strong, light cable 11 or other flexible member is carried from one hook to another, passing over the top of the panel assembly and, upon being tightened, drawing the middle of the ends and of the sides down into contact with the die. Therefore, if the panel assembly was originally flat, it is bowed lengthwise and its end portions are bowed crosswise, in tying it to the die.

After the rudimentary stave has been properly encased in the container or receptacle, the latter is placed in a suitable closed chamber, designated B in Fig. 5, and steam is introduced into the chamber until the pressure in the chamber reaches a predetermined value; namely a pressure sufficient to deform the layers or plies of the stave assembly and cause them to become curved longitudinally and transversely into conformity with the curvature of the die; Figs. 7 and 8 illustrating the condition of the stave assembly after this deformation has occurred. It should be observed that the pressure is applied uniformly over the entire exterior surfaces of the receptacle, thereby tending to equalize the pressures exerted on opposite sides of the die. Therefore, the die need be strong enough only to overcome the resistance to bending of the layers or plies of the stave assembly and to retain its shape while the assembly is being flexed and bonded. The heat from the steam is transmitted through the cover or blanket and through the die to the stave assembly, facilitating the molding of the wood and causing the bonding material first to soften and then to become hard and completely cured. We have found the molding and bonding can be effected with pressures that are substantially lower than those needed in ordinary presses and that the mixture of air originally present in the pressure chamber and saturated steam at the proper pressure to produce the desired pressure in the chamber, is also at the proper temperature for bonding with thermo-responsive bonding material. Therefore, the control of conditions required for bonding and molding depend only on keeping the gauge pressure in the steam chamber at the desired level.

In case there be a large amount of moisture in the stave assembly, or that steam should leak into the interior of the receptacle or container in which the panel assembly is housed, such a back pressure would be created within the receptacle or container as largely to offset the effect of the pressure on the exterior, so that neither proper molding nor proper bonding would be obtained. Consequently, for substantially all work in regular production except rather thin panels made from dry layers or plies in receptacles that are free from leakage, it is necessary to provide means for relieving the pressure within the receptacle or container, which can be done by providing proper vents. In the arrangement shown, the space within the receptacle or container is longer and wider than the corresponding dimensions of the stave assembly, so that steam that is generated in the assembly can escape through all edges of the veneers into free portions of such space. These free spaces form a border around the stave assembly and, by connecting them through suitable conduit means with the atmosphere outside of the steam chamber B, steam generated within or leaking into the container can escape to the surrounding atmosphere before any appreciable back pressure is built up. In the arrangement shown, two vent pipes 12 are connected to the space within the receptacle or container through and about midway of the ends of the two side flanges 2; these pipes being connected to a single discharge pipe 13 which, as shown in Fig. 5, extends through a wall of the steam chamber B. The illustration with respect to carrying the vent pipe to the outside atmosphere is intended to be only diagrammatic since, in actual practice, suitable fittings will of course be employed to facilitate the ready making and breaking of connections with the outside atmosphere, without the danger of the steam leaking out of the chamber.

In order that the blanket or cover may not be collapsed to such an extent beyond the edges of the stave assembly to close what may be termed the venting passage within the receptacle or container, suitable devices may be distributed along the edges of the stave assembly to hold the blanket or cover clear of the underlying portions of the die. In the arrangement shown, we simply lay a long chain 14 around the entire stave assembly; the chain being much longer than the perimeter of the assembly, so that it lies in folds. With this arrangement, no matter how great the external pressure, steam and heated air within the receptacle or container can always find its way through the interstices in the chain from all points along the edges of the assembly to the vent openings.

Our invention is applicable to the manufacture of flat panels, as well as curved or molded panels. In that case, the die will have a flat face on which the panel assembly may be set. Thus, in Figs. 9 and 10, there is shown a flat sheet metal die 15. To stiffen the die and, at the same time, provide a passage through which fluid under pressure in the receptacle may reach the discharge conduit 16, the marginal portions of the die are curled upwardly and then inwardly and downwardly to provide the die with a hollow border frame 17. The inside, downwardly-projecting wall 18 of the border frame does not touch the body portion of the die, thereby leaving a continuous, slot-like inlet 19 from the space in which the panel assembly is confined and the interior of the hollow frame. The rubber blanket or cover overlies the border frame and is clamped against the same by the clamping device heretofore described. The vent pipe 16 is connected to the border frame at any suitable point to carry away fluids whenever the pressure within the border frame is above atmospheric pressure.

Our process may be practiced by supplying heat independently of or in conjunction with the fluid that produces the pressure on the container. In other words, air under pressure or a mixture of air and steam could be employed as the pressure-producing means and all or some of the heat be supplied by a heating element associated with the receptacle or its contents. Thus, for example, an electric heating element can be associated with the receptacle or the work therein in such a manner as to supply the necessary heat units. In Fig. 10 we have illustrated the same construction as in Fig. 9 wherein there is secured to the under side of the die a flat electric heating element comprising three layers, namely a layer 20 of conductive material composed of wires or metal ribbons interposed between two layers 21 which, while non-conductors of electricity, are sufficiently heat-conductive to permit effective interchange of heat between the conductors of the heating element and the die. After a panel assembly has been sealed up in the receptacle or container, and the latter has been placed in the pressure chamber, the current for energizing the heating element may be turned on for the proper length of time by providing suitable connections leading to controls outside of the chamber.

The apparatus of the present invention has the advantages of being easily prepared, inexpensive to produce and being capable of producing precise plywood shapes with great efficiency. It will be understood that heavy rigid dies capable of withstanding the many thousands of pounds pressure applied to their surfaces are not required, nor is there any need for precisely fitting die elements to shape the ply elements. Moreover, the use of a blanket in combination with the die as contrasted with a fluid tight bag as used heretofore in the art, permits plywood elements to be formed of practically unlimited size, shape and complexity for the reason that the blanket can merely be laid over the assembly, thus avoiding the necessity of drawing a bag over the entire assembly and die, a procedure which cannot be followed in producing many complex shapes. Despite the extreme simplicity of the apparatus of the present invention, more uniformly distributed pressures can be applied to the panels than with male and female dies and the heat distribution is more uniform than with prior types of dies and blankets.

It will of course be understood that the drawings and the detailed description while disclosing the best form of our invention now known to us, serve to explain the principles of our invention and not to limit its scope to specific details except to the extent that specific details are included in the definitions of our invention constituting the appended claims.

We claim:

1. In an apparatus for shaping plywood and other moldable materials into articles having surfaces of predetermined shape, the combination of a relatively thin metal die of substantially uniform thickness and uniform heat conductivity having a die face of predetermined curved contour and an opposite surface, a sheet of flexible material overlying said die face to form a receptacle for receiving the moldable materials between said die face and said flexible sheet, means for securing the perimeter of said sheet and said die together in fluid tight sealing relation, a fluid pressure tank for receiving said receptacle, means for supplying a fluid under pressure to said tank to surround said receptacle with said fluid, whereby said sheet and said die are forced together with equal and opposed pressures to conform the die-contacting face of said material to the contour of said die face, and thereby to exert substantially equal pressures on said die face and said opposite surface of said die, and venting means communicating with the atmosphere exterior of said tank and with the interior of said receptacle when the latter is placed in said tank for allowing gases to escape from the interior of said receptacle to said atmosphere.

2. An apparatus for receiving and shaping plywood and other moldable material to a desired contour under fluid pressure, comprising a thin heat conducting die member of substantially uniform thickness having a front surface of said desired contour for receiving the material to be shaped and a back surface, a flexible fluid impervious cover overlying said front surface, means for securing said cover about said die member to form a sealed receptacle for said material, a pressure tank for receiving said receptacle, means for supplying heat and fluid under pressure to said tank to surround said receptacle and apply equal and oppositely directed pressures to the exterior of said cover overlying said front surface and to the back surface of said die member thereby to exert substantially equal pressures on the opposite surfaces of said die member, said die member being formed of such thin material that it has insufficient strength to withstand, without distortion, the fluid pressure if said pressure is applied to one surface, only, of said die member.

3. An apparatus for receiving and shaping plywood and other moldable material to a desired contour, comprising a thin sheet metal die member of substantially uniform thickness having a front surface of said desired contour for receiving said assembly and a back surface, means for retaining the material to be shaped on said front surface, a flexible blanket overlying said front surface, means securing the edges of said blanket in sealing engagement with said die member to form a receptacle for said material, a pressure tank for receiving said receptacle, means for supplying heat and fluid under pressure to said tank to surround said receptacle, and press said blanket and said die member together to mold said material against said front surface under a pressure equal to the pressure exerted on the back surface of said die member, thereby to avoid distortion of said die member, and means for venting fluids from the interior of said receptacle to the atmosphere exterior of said tank.

4. An apparatus for receiving and shaping plywood and other moldable material to a desired contour, comprising a thin sheet metal die member of substantially uniform thickness and heat conductivity having a curved front surface for receiving said material and a back surface, a flexible blanket substantially coextensive in area with said die member overlying said front surface, means securing the edges of said blanket in sealing engagement with said die member to form a receptacle for said material, a tank for receiving said receptacle, means for supplying heat and fluid under pressure to said tank to surround said receptacle and apply fluid pressure to the exterior of said blanket and the back surface of said die member to mold said material into conformity with said curved surface under a pressure equal to the pressure of the fluid on said back surface of said die member thereby to avoid distortion of said die member, and means for venting fluids in said receptacle to the atmosphere exterior of said tank.

JOSEPH A. POTCHEN.
OLIN H. BASQUIN.